Aug. 20, 1957 W. H. LYON 2,803,413
REEL CLAMP AND HANDLE FOR MAGNETIC TAPE
Filed July 23, 1954
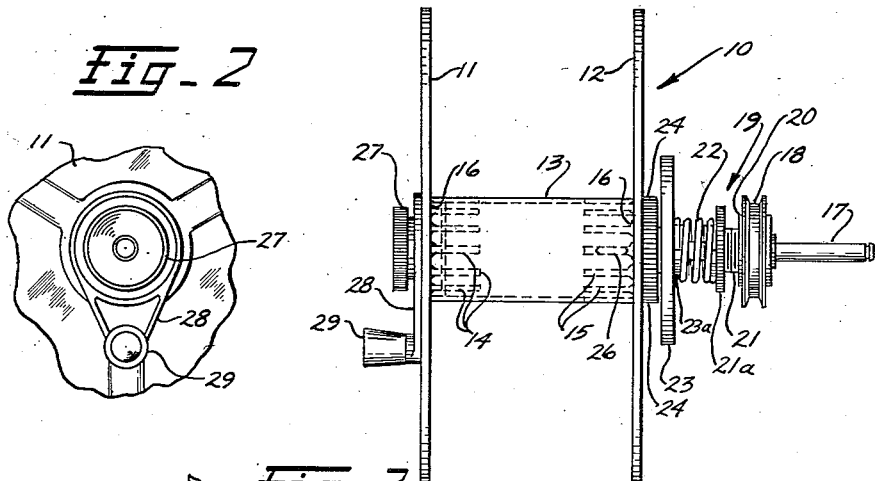
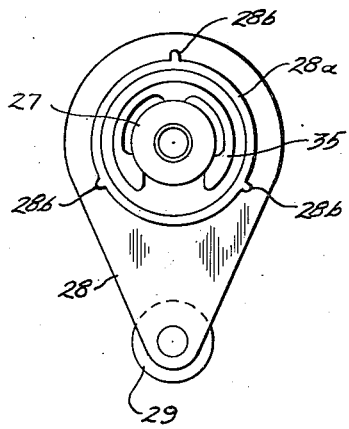
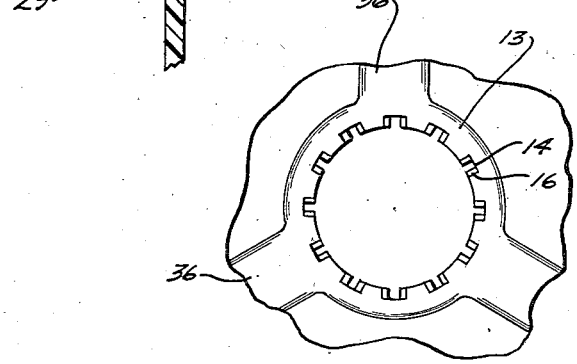
INVENTOR.
WILLIAM H. LYON
BY
ATTORNEY

United States Patent Office 2,803,413
Patented Aug. 20, 1957

2,803,413

REEL CLAMP AND HANDLE FOR MAGNETIC TAPE

William H. Lyon, New Haven, Conn., assignor to The Soundscriber Corporation, New Haven, Conn., a corporation of Connecticut Application July 23, 1954, Serial No. 445,375

2 Claims. (Cl. 242—68.3)

This invention relates to tape winding and reeling apparatus, and more particularly to a combined reel clamp and handle unit in which the handle is detachably locked to the spindle of the reel by a captive knurled clamping nut.

One object of the present invention is to provide a device of the above nature in which the handle of the captive clamping nut serves to rotate the reel, and the clamping nut serves to simultaneously secure the reel to its shaft and hold the handle on the reel.

A further object is to provide a device of the above nature which will be simple in construction, inexpensive to manufacture, easy to install and manipulate, compact, ornamental in appearance, and very efficient and durable in use.

With these and other objects in view, there has been illustrated on the accompanying drawing, one form in which the invention may conveniently be embodied in practice.

In the drawing,

Fig. 1 represents an end view of a tape reel upon which the invention has been assembled.

Fig. 2 is a fragmentary front view of the center portion of the reel showing the handle and the captive clamping nut in operating positions.

Fig. 3 is a transverse cross sectional view of the same, on an enlarged scale.

Fig. 4 is a rear view of the handle illustrating the location of the three radial keys, and showing how said handle is locked to the captive clamping nut.

Fig. 5 is a fragmentary front view of the reel hub and flange, with the handle removed to show the interior locking keyways.

Referring now to the drawing, in which like reference numerals denote corresponding parts throughout the several views, the numeral 10 indicates a plastic tape reel having a pair of integral circular end flanges 11 and 12 thereon. The reel 10 is provided with a central hollow hub 13 upon which a magnetic tape is adapted to be wound for use in a long time recording apparatus—said hub being provided at both opposite ends with a plurality of parallel interior narrow longitudinal slots or keyways 14, 15, having enlarged convergent entrances 16 (Fig. 1).

Provision is also made of a metallic shaft 17 of small diameter passing through the center of a metal drum 25 located within said hub 13, said shaft having a drive pulley 18 frictionally mounted thereon.

On the left of the drive pulley 18, as viewed in Fig. 1, provision is made of a spring clutch assembly 19 having a plate 20 on which is a reduced threaded section 21 for securing a knurled nut 21a, which permits the tension of a coil spring 22 to be manually adjusted.

One end of the coil spring 22 fits over a reduced shoulder on the nut 21a, and its other end is seated on a collar 23a which is mounted rigidly on the shaft 17. A bracket 23 serves to mount the entire reel assembly on the chassis (not shown) of the apparatus.

An enlarged knurled metallic stop nut 24 is screwed on the threaded end of the shaft drum 25 in contact with the reel flange 12, said nut 24 serving to permit lateral adjustment of the reel on said drum. The drum 25 is provided with an outstanding key 26 for engaging selectively in any one of the keyways 14, 15.

Provision is also made on the front of the reel 10 of a captive clamping nut 27 which is preferably knurled, and screwed upon the threaded forward end 31 of the shaft 17. The captive nut 27 serves to hold an apertured crank arm 28 securely upon the reel 10, said crank arm 28 being provided with a handle knob 29 mounted to swivel upon a bearing pin 30.

The captive clamping nut 27 is also provided with a tapped interior cylindrical recess 32 and has a conical forward end recess 33 to reduce the weight thereof.

The inner end of the captive nut 27 is provided with an annular recess 34 for frictionally receiving a thin U-shaped retaining clip plate 35, which positively prevents the withdrawal of the nut 27 from the crank arm 28.

Both of the reel flanges 11 and 12 are also preferably provided with radial ribs 36, for stiffening the construction thereof.

The crank arm 28 is also provided with a central inwardly extending hub 28a having three outstanding radial keys 28b which are adapted to fit detachably in the keyways 14, 15 of the reel hub 13.

Operation

In the operation of the device, when it is desired to remove the combined handle and captive nut from the reel 10, it will merely be necessary to unscrew the nut 27 from the threaded section 31 of the shaft 17, permitting the handle and nut unit to be moved forwardly from the reel flange 11. This frees the reel 10 for removal from its shaft 17 and the drum 25. To assemble the device, the reverse of these operations will be performed.

While there has been disclosed in this specification, one form in which the invention may be embodied, it is to be understood that this form is shown for the purpose of illustration only, and that the invention is not to be limited to the specific disclosure but may be modified and embodied in various other equivalent forms without departing from its spirit. In short, the invention includes all the modifications and embodiments coming within the scope of the following claims.

Having thus fully described the invention, what is claimed as new, and for which it is desired to secure Letters Patent is:

1. A tape reel having a cylindrical hollow hub and a pair of reel flanges, said hub being provided with a plurality of parallel narrow longitudinal interior keyways in both ends thereof, a drive shaft, an interior drum mounted on said drive shaft and having a key for selectively engaging in any one of said keyways, a crank arm having a circular aperture and an inwardly extending hub provided with a plurality of outstanding keys selectively fitting within a like number of said keyways, and a captive nut located within said aperture and threadedly secured to said shaft for permitting the removal of said crankarm and said reel whenever desired.

2. The invention as defined in claim 1, in which said captive nut is rotatably mounted within the aperture of said crank arm.

References Cited in the file of this patent

UNITED STATES PATENTS

| 1,735,897 | Edgar et al. | Nov. 19, 1929 |
| 1,915,238 | Mosher et al. | June 20, 1933 |
| 2,476,928 | Thomas | June 19, 1949 |